Patented Dec. 25, 1945

2,391,493

UNITED STATES PATENT OFFICE 2,391,493

QUICK SETTING CEMENT

Eugene Wainer and Allen Salomon, Niagara Falls, N. Y., assignors to The Titanium Alloy Manufacturing Company, New York, N. Y., a corporation of Maine No Drawing. Application April 21, 1942, Serial No. 439,928

13 Claims. (Cl. 106—104)

This invention relates to the preparation of artificial stone and compositions therefor, particularly for use in the manufacture of art objects, gift objects, book ends, display structures for show windows, and decorative knickknacks generally.

The procedure normally used in the manufacture of such articles involves their preparation from air hardening compositions or cements cast as fluid mixtures into a mold of the required shape. Such mixtures are prepared by adding water or other aqueous liquid to suitable dry compositions. The dry compositions, before adding water, should be stable in that form so that they may be stored for long periods of time without deterioration. Commonly used materials or compositions for this purpose are (1) plaster of Paris, (2) Portland cement, and (3) mixtures of dry acidic and dry basic materials. Metals are not suitable because of the expense of the molds and the materials and the high temperatures required. Disadvantages in the use of plaster of Paris are the low specific gravity and the low strength. Portland cement has satisfactory strength, but when used alone the high setting shrinkage causes binding and cracking in undercuts. Furthermore, the time required for setting and hardening is usually much too long. Finally, development of the ultimate strength of Portland cement requires humid atmospheres or immersion in water during setting, a requirement not always possible or convenient. The principal difficulty with dry mixtures of acidic and basic materials is that it is extremely difficult to control the setting time and at the same time obtain the required strength, hardness, density and fidelity of reproduction of the mold surfaces.

It is therefore an object of this invention to provide compositions which can be handled as fluid mixtures in casting, and which are stable in dry form. It is another object to provide such compositions which can be made to set or harden in a short and commercially usable time. It is a still further object to provide such compositions which develop relatively enormous strengths in setting. It is a still further object to provide such compositions which, when setting, will perfectly and faithfully reproduce the mold surfaces without any special precautions. A further object is to provide compositions which will permit considerable variation in setting time and at the same time obtain satisfactory strength, density, and hardness. Other objects will appear hereinafter.

These objects are accomplished by providing a dry composition containing 40 to 80 per cent of a solid inert material, together with minor amounts of a solid inorganic basic material, a solid inorganic acid salt and a water soluble alkalinous fluoride. When water is added to such a composition, it is capable of setting up in a period of time which can be relatively accurately predetermined according to the amounts and kinds of the various ingredients present.

The inert material acts to partially control the setting time by the fact that it functions as a diluent for the active substances, and to decrease the cost by using more readily available materials, without substantially sacrificing other desirable characteristics. In addition, the presence of the inert material markedly increases the strength of the finished article, as compared with the strength of similar compositions without inert material. This effect is most marked with median amounts of inert material, the strength decreasing with higher amounts of inert material (particularly 80 per cent and above). The economies involved, however, are such that the most practical commercial compositions are not those exhibiting the highest obtainable strengths. In other words, articles exhibiting less than maximum strength are entirely satisfactory for all practical purposes.

By the term "inert material" is meant a material which, when water is added, neither dissolves in water nor chemically reacts with water or the solid ingredients of the composition. Substances which fulfill these requirements are silica, zircon, zirconia, fused alumina, kyanite and other aluminosilicate minerals, rutile, feldspar, granites, chromite, ilmenite, and a host of other similar materials. The particle sizes of the inert material should preferably be graded to yield the highest ultimate strength. To this end, a mixture of 2 parts by weight of minus 60 plus 150 mesh granules plus one part by weight of minus 200 mesh powder is preferred. On a volume basis, the ratio is roughly 3 to 2. The preferred limits are 45 to 75 per cent by volume of material passing a 35 mesh screen but coarser than 200 mesh, and 55 to 25 per cent by volume of material finer than 200 mesh. The total quantity of inert material preferably constitutes 50 to 80 per cent of the composition.

Solid inorganic acid salts which may be used are the acid phosphates, sulphates and arsenates of the alkali metals and ammonium, particularly the monobasic diacid phosphates. Although the acid arsenates have desirable mechanical properties, their poisonous character will normally preclude their use. To a lesser degree the acid phosphates of the alkaline earths are suitable, but the alkali metal and ammonium acid phosphates are preferred. In general, the hydrated compounds crystallized from water are preferred, since the anhydrous compounds are usually hygroscopic and tend to hydrate and liquefy on exposure to moist atmospheres. This is particularly true of the acid sulfates. The acid salt normally constitutes 10 to 35 per cent (preferably 10 to 25 per cent) of the composition.

Suitable basic materials are deadburned magnesite (mostly magnesia) either of natural or synthetic source, deadburned dolomite, and dead burned aluminates of the alkali and alkaline earth metals. Pure magnesia, pure lime and the unburned alkali and alkaline earth aluminates will serve, but all have a tendency to hydrate and carbonate on exposure to the ordinary atmosphere. If the mixed dry composition is kept sealed from the atmosphere until ready for use, no ill effects are observed and an entirely suitable composition is made available. However, the need for sealed containers is a commercial disadvantage, and this disadvantage is obviated by fusing or dead burning these basic materials, particularly in the presence of a small amount of iron oxide and silica. The dead burning may be carried out, for example, at 1400° C. In any case, the basic materials may be used singly or in mixture, and normally constitute 10 to 40 per cent (preferably 10 to 25 per cent) of the composition.

It is believed that the presence of iron oxide and alumina prior to dead burning serves to form around the particles of basic material a thin film of a glassy matrix, which prevents contact of water vapor or carbon dioxide in the air with the basic material. As many commercial varieties of magnesite and dolomite contain iron oxide or compounds thereof and silica or its compounds, further modification of these materials is usually not necessary. In some cases a certain amount of silica is absorbed from the apparatus in which the dead burning is carried out. For the varieties which do not contain such impurities, or in the case of the pure synthetic materials, or in the case of the aluminates, it may be necessary to add iron oxide or silica or both before burning.

In the case of magnesia, magnesite or dolomite, at least 1 per cent each of iron oxide ($Fe_2O_3$) and silica based on the weight of the basic material as 100, should be present for best results, whether originally present or intentionally added. In the case of the aluminates, at least 3 per cent each of iron oxide and silica, based on the weight of the aluminates, should be added. Increase in the amount of iron oxide and alumina considerably above these quantities are not harmful, except as they reduce the effectiveness of the basic material, mainly by dilution, and except insofar as iron oxide discolors the final product. For this reason, the amount of iron oxide and silica may each extend to as much as 50 per cent of the amount of basic material, although for best results each ingredient should not be more than 15 per cent of the weight of the basic material, particularly in the case of magnesite.

The basic material and the acid salt, when water is added, are the two cementing ingredients of the composition, apparently setting up the composition by neutralization of each other. In forming the composition, it is found that a stoichiometric excess of the basic material is required for the best results, according to the following typical equations:

$$3MgO + 3NH_4H_2PO_4 \rightarrow Mg_3(PO_4)_2 + (NH_4)_3PO_4 + 3H_2O$$
$$MgO + 2NaHSO_4 \rightarrow MgSO_4 + Na_2SO_4 + H_2O$$

The amount of basic material, on the basis of the stoichiometric requirements of the above typical equations, must be at least equal to such requirements and should normally be at least double such stoichiometric requirements. When the proportion of basic material is much lower than this the composition remains weak and crumbly after setting.

Of the aforementioned basic materials, magnesia (including dead burned magnesite) is the most reactive and quickest setting, the alkali aluminates being next and the alkaline earth aluminates last. Substitution of one basic material for another thus affords some variation in setting time.

However, it has been found, in accordance with this invention, that the setting time may be controlled to the best effect by incorporating in the composition a minor amount of a water soluble fluoride. This is particularly advantageous in the case of dead burned magnesite, since this material is both inexpensive and readily available and also reacts too quickly for commercial practice. Besides increasing the setting time, thus permitting greater latitude in handling the composition, the addition of such fluoride serves to secure much greater strength in the finished product, even when relatively small amounts are added. For example, a composition consisting of certain proportions of dead burned magnesite and ammonium dihydrogen phosphate will set and harden 4 minutes after the addition of water. Addition of 0.7% of sodium silicofluoride will cause the composition to harden in 10 to 12 minutes after adding water and will exhibit a compressive strength after 24 hours standing roughly three times that obtained in the absence of the fluoride. Fluorides which are suitable for use in the practice of the present invention need not be highly soluble, although in general fluorides having a water solubility of at least 0.1 per cent in aqueous solution are preferred. Among the fluorides which are suitable there are in fact several which are not very highly soluble, particularly sodium silicofluoride, which is highly suitable from a cost standpoint. In general, the normal fluorides, silico fluorides, and acid fluorides of the alkali and alkaline earth metals and ammonium which are appreciably water soluble may be used in the practice of the invention. Particularly desirable are the normal, acid or silico fluorides of sodium and ammonium. The fluoride is normally used to the extent of 0.2 to 4 per cent of the weight of the dry composition, these percentage figures being the per cent of fluorine in the dry composition. Thus 0.2 to 4 per cent fluorine can be attained by adding approximately 0.3 to 6 per cent sodium silicofluoride, or approximately 0.4 to 8 per cent $NH_4F$ or $KHF_2$.

In mixing the composition, it is preferred to mix first the finely divided (minus 200 mesh) inert material and the basic material. The acid salt and the fluoride are mixed in next, and the coarse (plus 200 mesh) inert material last. When mixed in this fashion the dry composition will remain shelf stable for a period of at least six months. When ready for use the dry composition is usually added to a measured amount of water and quickly and thoroughly stirred. Denser casts are obtained through the addition of a few drops of a wetting agent such as a sulfonated oil plus a few drops of a defrothing agent such as octyl alcohol. The water content used is preferably approximately 1 volume for each 5 to 6 volumes of dry composition, specific amounts being given in the examples.

The invention having been described, the following specific modes of practicing the same are now given. Suitable commercial dead burned magnesites for use in these examples may have analyses such as the following: (a) 87% MgO, 2.5% $Fe_2O_3$, 2% $Al_2O_3$, 2.1% CaO, 2.6% $SiO_2$, balance mostly $CO_2$ and $H_2O$; (b) 81% MgO, 8.9% $Fe_2O_3$, 1.8% $Al_2O_3$, 1.6% CaO, 5.4% $SiO_2$, balance mostly $CO_2$ and $H_2O$.

Example 1

| | | |
|---|---|---|
| −200 mesh inert material, such as powdered sand | cc | 20 |
| −60+150 mesh inert material, such as sand | cc | 30 |
| Dead burned magnesite (5 per cent +200 mesh) | grams | 10 |
| Monoammonium acid phosphate | do | 10 |
| Sodium silicofluoride | do | 0.7 |

The above are thoroughly mixed and added to 10 cc. of water, stirred till smooth and then poured into the mold. This composition will remain fluid for 8 to 10 minutes and will harden thoroughly in 15 minutes.

Example 2

| | | |
|---|---|---|
| −200 mesh inert material as in Example 1 | cc | 20 |
| −60+150 mesh inert material as in Example 1 | cc | 30 |
| Dead burned magnesite (5 per cent +200 mesh) | grams | 20 |
| Monoammonium acid phosphate | do | 20 |
| Sodium silicofluoride | do | 1.0 |

The above are thoroughly mixed and added to 14 cc. of water, stirred till smooth and then poured into the mold. This composition will remain fluid for 7 to 9 minutes and will harden thoroughly in 15 minutes. After 24 hours the finished article is 1½ to 2 times stronger than in Example 1.

Example 3

| | | |
|---|---|---|
| −200 mesh inert material as in Example 1 | cc | 20 |
| −60+150 mesh inert material as in Example 1 | cc | 30 |
| Dead burned magnesite (5 per cent +200 mesh) | grams | 40 |
| Monoammonium acid phosphate | do | 40 |
| Sodium silicofluoride | do | 1.5 |

The above are thoroughly mixed and added to 22 cc. of water, stirred till smooth and then poured into the mold. This composition will remain fluid for 6 to 8 minutes and will harden thoroughly in 11 to 12 minutes. After 24 hours the finished article is 1½ to 2 times stronger than in Example 2.

Example 4

The same procedure is followed as in Example 2 except that 20 grams of $NH_4HSO_4.H_2O$ replaces the monoammonium acid phosphate. In this case the working time is 5 to 6 minutes and the hardening time is 10 to 12 minutes. The strength after 24 hours standing is slightly less than that developed in Example 2.

Example 5

The same procedure is followed as in Example 2 except that 20 grams of monosodium dihydrogen phosphate replaces the monoammonium dihydrogen phosphate. Working time is 7 to 9 minutes and thorough hardening takes place in 15 minutes. The strength developed after 24 hours is slightly greater than the material according to Example 2.

Example 6

| | | |
|---|---|---|
| −200 mesh inert material as in Example 1 | cc | 20 |
| −60+150 mesh inert material as in Example 1 | cc | 30 |
| Dead burned $CaAl_2O_4$ containing 15% $Fe_2O_3$ and 5% $SiO_2$ dead burned to the extent that no effervescence takes place when treated with acid, and of mesh size 5% +200 mesh | grams | 20 |
| Monoammonium acid phosphate, or sodium dihydrogen phosphate, or hydrated ammonium acid sulfate | grams | 16 |
| Sodium silicofluoride | do | 1.0 |

The above are thoroughly mixed and added to 13 cc. of water, stirred till smooth and then poured into the mold. The composition will remain fluid for 15 to 17 minutes and will harden thoroughly in 20 to 25 minutes. The strength after 24 hours is slightly greater than that of Example 2.

Example 7

| | | |
|---|---|---|
| −200 mesh inert material as in Example 1 | cc | 20 |
| −60+150 mesh inert material as in Example 1 | cc | 30 |
| $BaAl_2O_4$ containing 15% $Fe_2O_3$ and 5% $SiO_2$, dead burned to the extent that no effervescence takes place when treated with acid, and of mesh size 5% +200 mesh | grams | 30 |
| Monoammonium acid phosphate, or sodium dihydrogen phosphate, or hydrated ammonium acid sulfate | grams | 15 |
| Sodium silicofluoride | do | 1.0 |

The above are thoroughly mixed and added to 15 cc. of water, stirred until smooth and then poured into the mold. The composition remains fluid 14 to 15 minutes and hardens in 18 to 20 minutes. The strength after 24 hours is midway between that of Examples 2 and 3.

Example 8

| | | |
|---|---|---|
| −200 mesh inert material, such as sand | cc | 20 |
| −60+150 mesh inert material, such as sand | cc | 30 |
| Dead burned magnesite (5% +200 mesh) | grams | 20 |
| Monoammonium acid phosphate | do | 20 |
| Ammonium fluoride. (In place of $NH_4F$, 0.77 gram of $NH_4HF_2$, or 1.05 grams of $KHF_2$, or 1.13 grams of NaF, or 0.84 gram of $NaHF_2$, can be used) | gram | 1.0 |

The above are thoroughly mixed and added to 14 cc. of water, stirred until smooth and then poured into the mold. This composition will remain fluid 20 to 24 minutes and will harden thoroughly in 30 to 35 minutes. Its use is particularly advantageous where very large castings or great numbers of castings must be made.

In the description above and the accompanying claims, when compositions and percentages are mentioned, compositions and percentages by weight are understood, unless otherwise so stated. The term "alkalinous" as used in the appended claims is intended to be generic to the alkali metals, ammonium and alkaline earth metals. The term "fluoride" as used in the appended claims is intended to include the "normal" fluorides (i. e. those in which only a single positive element or radical appears, such as NaF or NH4F), the acid fluorides and the silicofluorides.

As many variations are possible within the scope of this invention, it is not intended to be limited except as defined by the appended claims.

We claim:

1. A stable dry composition capable, upon the addition of water, of setting to a synthetic stone, comprising 40 to 80 per cent of a solid water insoluble inert material, 10 to 35 per cent of an alkalinous acid phosphate, 10 to 35 per cent of dead burned magnesite, and 0.5 to 5 per cent of a water soluble alkalinous fluoride.

2. A stable dry composition capable, upon the addition of water, of setting to a synthetic stone, comprising 40 to 80 per cent of a solid water insoluble inert material, 10 to 35 per cent of an alkalinous acid sulfate, 10 to 35 per cent of dead burned magnesite, and 0.5 to 5 per cent of an alkalinous fluoride.

3. A stable dry composition capable, upon the addition of water, of setting to a synthetic stone, comprising 40 to 80 per cent of a solid water insoluble material, 10 to 25 per cent of an alkalinous acid phosphate, 10 to 25 per cent of dead burned magnesite, and 0.5 to 5 per cent of a sodium fluoride.

4. A stable dry composition capable, upon the addition of water, of setting to a synthetic stone, comprising 40 to 80 per cent of a solid water insoluble inert material, 10 to 25 per cent of an alkalinous acid phosphate, 10 to 25 per cent of dead burned magnesite, and 0.5 to 5 per cent of an ammonium fluoride.

5. A stable dry composition capable, upon the addition of water, of setting to a synthetic stone, comprising 40 to 80 per cent of a solid water insoluble inert material, 10 to 25 per cent of an ammonium acid phosphate, 10 to 25 per cent of dead burned magnesite, and 0.5 to 5 per cent of a sodium fluoride.

6. A stable dry composition capable, upon the addition of water, of setting to a synthetic stone, comprising 40 to 80 per cent of a solid water insoluble inert material, 10 to 25 per cent of a sodium acid phosphate, 10 to 25 per cent of dead burned magnesite, and 0.5 to 5 per cent of a sodium fluoride.

7. A stable dry composition capable, upon the addition of water, of setting to a synthetic stone, comprising 40 to 80 per cent of a solid water insoluble inert material, 10 to 25 per cent of an ammonium acid phosphate, 10 to 25 per cent of dead burned magnesite, and 0.5 to 5 per cent of an ammonium fluoride.

8. A stable dry composition capable, upon the addition of water, of setting to a synthetic stone, comprising 40 to 80 per cent of a solid water insoluble inert material, 10 to 25 per cent of a sodium acid phosphate, 10 to 25 per cent of dead burned magnesite, and 0.5 to 5 per cent of an ammonium fluoride.

9. The composition of claim 5, characterized in that said ammonium acid phosphate is monoammonium dihydrogen phosphate and that said sodium fluoride is sodium silico fluoride.

10. A stable dry composition capable, upon the addition of water, of setting to a synthetic stone, comprising 40 to 80 per cent of a solid water insoluble inert material, of which 45 to 75 per cent by volume is minus 35 plus 200 mesh and 25 to 55 per cent by volume is minus 20 mesh, 10 to 25 per cent of an alkalinous acid phosphate, 10 to 25 per cent of dead burned magnesite, and 0.5 to 5 per cent of an alkalinous fluoride.

11. A stable dry composition capable, upon the addition of water, of setting to a synthetic stone, comprising 40 to 80 per cent of a solid water insoluble inert material, 10 to 35 per cent of an inorganic acid salt of the class consisting of alkalinous acid phosphate and alkalinous acid sulfate, 10 to 35 per cent of a basic material, said basic material comprising dead burned magnesite containing 1 to 50 per cent each, based on the weight of the dead burned magnesite, of iron oxide and silica, and 0.5 to 5 per cent of an alkalinous fluoride.

12. A stable dry composition capable, upon the addition of water, of setting to a synthetic stone, comprising 40 to 80 per cent of a solid water insoluble inert material, 10 to 25 per cent of an alkalinous acid phosphate, 10 to 25 per cent of a basic material, said basic material comprising dead burned magnesite containing 1 to 15 per cent each, based on the weight of the dead burned magnesite, of iron oxide and silica, and 0.5 to 5 per cent of an alkalinous fluoride.

13. A stable dry composition capable, upon the addition of water, of setting to a synthetic stone, comprising 40 to 80 per cent of a solid water insoluble inert material, 10 to 35 per cent of an inorganic acid salt of the class consisting of alkalinous acid phosphate and alkalinous acid sulphate, 10 to 35 per cent of a basic material of the class consisting of dead burned magnesite and dead burned aluminate, and 0.5 to 5 per cent of a water soluble alkalinous fluoride.

EUGENE WAINER.
ALLEN SALOMON.